United States Patent
Mansky et al.

[15] 3,656,964
[45] Apr. 18, 1972

[54] SOLUBLE COFFEE PROCESS

[72] Inventors: Michael H. Mansky, Upper Montclair, N.J.; Esra Pitchon, Flushing, N.Y.

[73] Assignee: General Foods Corporation, White Plains, N.Y.

[22] Filed: Nov. 10, 1969

[21] Appl. No.: 875,497

[52] U.S. Cl. ................................................. 99/71
[51] Int. Cl. ............................................... A23f 1/08
[58] Field of Search ....................................... 99/71

[56] References Cited

UNITED STATES PATENTS

| | | | |
|---|---|---|---|
| 3,493,388 | 2/1970 | Hair | 99/71 |
| 3,089,772 | 5/1963 | Bowden et al. | 99/71 |
| 2,949,364 | 8/1960 | Bilenker | 99/71 |
| 3,224,879 | 12/1965 | Di Nardo | 99/71 |

FOREIGN PATENTS OR APPLICATIONS

| | | | |
|---|---|---|---|
| 1,552,967 | 12/1968 | France | 99/71 |

OTHER PUBLICATIONS

Sivetz & Foote, Coffee Processing Technology Vol. I, (1963) pp. 325–327.

*Primary Examiner*—Tim R. Miles
*Assistant Examiner*—William L. Mentlik
*Attorney*—Gerald E. Jacobs, Bruno P. Struzzi and Thomas V. Sullivan

[57] ABSTRACT

A process for producing a soluble coffee has been discovered in which a unique use of standard percolation columns results in an improved process. The process involves using two fresh columns, volatile aromatics being stripped from one fresh column and taking a double draw-off from every other fresh column in order to obtain a steeper concentration gradient in the resultant extract. The extract is split into high and low concentration portions and subjected to further processing.

12 Claims, No Drawings

SOLUBLE COFFEE PROCESS

BACKGROUND OF THE INVENTION

This invention pertains to a new and improved process for making a soluble coffee. More particularly, it involves a unique percolation technique wherein standard percolators are used to obtain an extract with steeper concentration and quality gradients.

Most commercial coffee percolation processes today use a battery of from 6 to 8 extraction columns to extract soluble coffee solids from roasted and ground coffee. This battery of extraction columns is commonly referred to as a percolation set and each column within the set is referred to as a percolator. These columns are what is meant when reference is made to a commercial percolator.

Percolation is a semi-continuous, counter-current operation. This description of percolation is intended to convey the fact that the flow of coffee and water through the set of percolators is counter-current. The flow of water is continuous, while the flow of coffee through the system is a batch operation. All of the percolators in the set are charged with roasted and ground coffee. Hot water is then fed into the percolator and flows successively through all of the percolators in the set, extracting solids from the coffee within the percolators as it flows and finally being drawn off from the last percolator as coffee extract. The percolator to which the water was being fed is emptied while the extract is being drawn off and a fresh charge of coffee is loaded into this percolator. After a predetermined quantity of extract has been drawn off the flow of water is diverted into this freshly loaded percolator (fresh column) and when the column has been filled with water a new draw-off is commenced and the next column which had been receiving the feed water (spent stage) is emptied and refilled with fresh coffee. In this manner the percolators are rotated in order from the fresh stage back to the most spent stage and the water flows from the most spent stage through the set to the fresh stage.

The foregoing description of a percolation operation is the standard means of operating a percolator set in the known processes today. Note, that there is one fresh stage and one spent stage in every cycle and that extract is drawn off from every percolator as it becomes a fresh stage.

It is known in the art that the concentration of coffee solids in the extract drawn off tends to vary with the highest concentration and best quality being obtained at the start of the draw-off, and the lowest concentration being obtained at the end of the draw-off. This variation in solids and quality are referred to as concentration and quality gradients.

Some prior art processes have tried to take advantage of the concentration quality gradients by splitting the draw-off into two fractions. The first fraction, having a higher quality and greater concentration, being subjected to relatively mild treatment and the second fraction, being of poorer quality and low concentration, being subjected to evaporative concentration. The concentrated extract is then added back to the first portion of extract for further processing. While this concept has merit, the concentration and quality gradients obtained via standard percolation techniques are not large enough to make this process attractive.

Other prior art processes have taught that volatile aromatics can be stripped from the roasted and ground coffee after the coffee has been placed in the percolator but prior to the start of the extraction cycle in this percolator. The volatiles stripped out are added back to either the extract or the dry coffee to enhance the flavor of the soluble coffee finally produced. This type of enhancement process is desirable. However, it has been found that some coffees are degraded when subjected to a stripping action, possibly due to the formation of undesirable acids. As every percolator in a normal percolation process is a fresh stage from which extract is drawn off, much of the improvement achieved by addback of the volatiles is lost due to the fact that the solids drawn off from the fresh stage are degraded as compared to solids drawn off from a percolator which has not been subjected to stripping. In a co-pending application, Ser. No. 875,227, filed Nov. 19, 1969, Pitchon describes a novel method of removing undesirable acids from steamed coffee.

SUMMARY OF THE INVENTION

A unique manner of operating a percolator set has been discovered which increases the concentration and quality gradients in the extract drawn off from the fresh stage. The steeper gradients make it possible to take advantage of splitting the extract into concentrated and dilute portions as significantly more solids are available via the process of this invention in the concentrated portion of the extract. Also, it is now possible to strip volatiles out of every other percolator and to draw-off extract from every other percolator, the percolator being used as the fresh stage for the draw-off not having been subjected to a volatile stripping operation. Thus, the solids obtained in the first portion of the draw-off have not been degraded by a volatile stripping action.

These desirable results are achieved by operating the percolators within a set as pairs. Two fresh stages (percolators) are introduced on stream at the end of each draw-off, and the percolators representing the two most spent stages are emptied and loaded with freshly ground roasted coffee while a double draw-off is taken from one of the two fresh stages previously put on stream. The technique of using two fresh stages and a double draw-off from one of the fresh stages yields the same overall quantity of soluble solids and an extract which has steeper density and quality gradients. Also, the fresh stage which is not being used as a draw-off stage can be subjected to a volatile stripping operation without effecting the quality of the solids of the first portion of the extract being drawn off.

The double draw-off can be split into two portions, the first portion having a significantly higher concentration and improved quality and being not more than one-half of the total draw-off. The second portion of extract can be subjected to further volatile stripping techniques and evaporative concentration prior to drying without adversely effecting the overall quality of the soluble coffee produced via the process of this invention. The two portions of extract may be dried separately or may be blended together prior to drying. The separate portions of extract can be subjected to different drying techniques, e.g., the first portion may be freeze-dried and the second portion spray dried, or they may be dried via the same technique.

DESCRIPTION OF THE PREFERRED EMBODIMENT

The process of this invention is intended to increase the concentration and quality gradients normally obtained in standard percolation and to take advantage of the increased gradients. A standard percolator set is used in practicing this invention and may contain any desired number of percolators normally used in commercial percolation processes. From six to eight percolators in a set is preferred and a six percolator set is most preferred.

As previously explained in the description of the prior art, percolation is a semi-continuous, counter-current operation. In standard percolation techniques every percolator, as it becomes the fresh stage, has extract drawn off from it. In the process of this invention, the percolators are operated in pairs and every other percolator has extract drawn off from it. The draw-off in this operation is a double draw-off, i.e., twice the weight of extract drawn off in a standard percolation operation is drawn off when practicing the process of this invention, so that the overall yield of soluble solids in the process of this invention is equivalent to the yield obtained in standard percolation processes.

In order to more fully understand the process of this invention the operation of a conventional process and the process of this invention are outlined in Tables I and II. The sequence of operation shown in the tables assumes that there are six percolators (numbered 1 through 6) in the percolation set and that the process has been started up and is in equilibrium operation.

Table I — Normal Percolation

| Extract Being Drawn Off From Percolator Number | Feed Water to Percolator Number | Emptying & Loading Percolator Number |
|---|---|---|
| 6 | 2 | 1 |
| 1 | 3 | 2 |
| 2 | 4 | 3 |
| 3 | 5 | 4 |
| 4 | 6 | 5 |
| 5 | 1 | 6 |
| 6 | 2 | 1 |

Table II — Process Of This Invention

| Extract Being Drawn Off From Percolator Number | Feed Water to Percolator Number | Emptying & Loading Percolator Number |
|---|---|---|
| 6 | 3 | 1 & 2 |
| 2 | 5 | 3 & 4 |
| 4 | 1 | 5 & 6 |
| 6 | 3 | 1 & 2 |

It is readily apparent from the tables that two fresh stages are put on stream and that extract is drawn off from one of these two percolators as compared to extract being drawn off from each percolator in a normal percolation operation. It is this unique percolation operation combined with the double draw-off taken which results in the desirable increase in the concentration and quality gradients of the extract obtained via the process of this invention. While Table II indicates that two percolators are emptied and loaded simultaneously, these operations can actually be staggered such that one of the percolators is on stream while the first one is being emptied and loaded. Referring to line 1 of Table II it shows that while extract is being drawn off from percolator 6 the feed water is being introduced to percolator 3 and percolators 1 and 2 are being emptied and loaded. Actually the feed water can be entering percolator 2 during half of the draw-off cycle while percolator 1 is being emptied and loaded. The feed water can then be diverted to percolator 3 during the second half of the draw-off cycle and percolator 2 can be emptied and loaded while the draw-off is completed and percolator 1 is being filled with liquid. This is actually a preferred technique as it allows more percolators to be on stream for a greater portion of the operating time than would be possible if percolators 1 and 2 were actually emptied simultaneously. Also note, that while two fresh stages are said to be put on stream together, the flow of extract is from percolator to percolator and percolator number 1 must be filled before percolator 2 can be filled to maintain the normal counter-current flow in the percolator system.

Note, that if a percolator set containing an odd number of percolators is used, the same two percolators will not always be the pair of percolators emptied and put back on stream together. It is the two most spent stages that are reloaded while a cycle of extract is being drawn off.

One of the advantages of the process of this invention now becomes readily apparent. There are many prior art processes which teach methods of stripping desirable aromatic volatiles out of roasted and ground coffee prior to percolating the coffee. Several such methods are described in U.S. Pat. Nos. 3,035,922; 2,362,206; 3,132,947; 3,148,070, and 3,421,901. The flavor characteristics of the aromatics produced via the various prior art processes will vary and therefore the amount of aromatics added back subsequently to the coffee and the manner and point of addition will vary. Some of these aromatics are added back to the extract prior to drying the extract. Others may be added back or plated onto the dry soluble coffee after the extract is dried.

These prior art processes have been known to degrade the quality of the more flavorful roasted coffees used in the percolation process and consequently have resulted in a coffee extract wherein the quality of the extracted soluble solids is somewhat degraded. This degradation of soluble solids in the initial portion of the extract is avoided by the process of this invention by stripping volatiles from every other fresh stage to obtain desirable aromatics. The percolator subjected to the stripping operation is the fresh stage which is not used for draw-off purposes in the process of this invention. Thus, referring back to Table II, percolators 1, 3, and 5 would be the percolators subjected to the aroma stripping processes of the prior art. It is well known in the art that the most flavorful solids contained in coffee extract are obtained in the initial portion of the draw-off cycle. By only subjecting percolators 1, 3, and 5 to the stripping operation the initial solids drawn off from percolators 2, 4, and 6 will be obtained from roasted and ground coffee which have not been subjected to the stripping operations. Thus, the critical flavor fraction of the extract will be of good quality and not degraded by any aroma stripping technique.

A major advantage of the process of this invention is that the extract drawn off from a percolator can be split into two portions, to obtain an initial fraction of extract which is of high concentration and quality and contains more of the total solids than can be obtained in standard percolation processes. The first portion of the extract will contain at most 50 percent by weight of the total extract drawn off in a given cycle. Preferably, this first portion is limited to about 15 to 33 percent of the total weight of the extract cycle. The quantity of solids in this first portion and the quality of these solids will be significantly greater then the corresponding concentration and quality of the solids in the second portion of the extract, the remainder of the draw-off cycle.

The advantage of this larger portion of high concentration, high quality extract is that when combined with subsequent processing steps the overall result is an economical process for production of a high quality soluble coffee.

One means of achieving a high quality soluble coffee today is a process wherein the coffee extract is freeze concentrated, frozen and freeze dried. Freeze concentration is used, although an expensive technique, in order to avoid degradation of the coffee flavor during the concentration step. By taking advantage of the high concentration gradient achieved with the process of this invention and splitting the extract drawn off into two portions, the second portion may be concentrated by more economical techniques such as evaporative concentration and then combined with the first portion of the extract to achieve the overall desired concentration prior to freeze drying.

While the foregoing technique is not unknown in the prior art, the significant advantage of the process of this invention is that a much higher proportion of solids will be in the first portion of the extract than that obtained when utilizing standard percolation techniques. As will be seen in the examples, about 10 percent more solids are available in the first portion of the extract via the process of this invention.

As a further improvement, aromatics may be stripped out of the second portion of the extract prior to concentrating said extract. These aromatics can be added back to the first portion of the extract prior to further treatment of the extract.

The two portions of extract will not have to be recombined as extracts. One alternative is to spray dry the second portion of the extract and freeze dry the first portion of the extract. The dry solids would then be blended prior to packaging.

When practicing the process of this invention, the percolation conditions are controlled as in standard percolation processes and the operating conditions are essentially the same as those in standard percolation processes. Thus, the feed water temperature will normally be the highest temperature in the percolation system and typically may vary from about 250° to 350° F. The temperature of the extract as it goes into the fresh stage will normally be reduced to less than 200° F and preferably less than 180° F in order to avoid heat degradation of the quality solids extracted in the fresh stage. The extract drawn off from the fresh stage will normally be cooled to less than 100° F and preferably less than 70° F in order to further protect the quality of the extracted solids. The overall extract concentration of the extract achieved in the process of this invention may be essentially the same as that obtained in standard percolation processes when exposed to comparable temperature profiles and overall total extraction times. The individual cycle times are somewhat larger in the process of this invention as a double draw-off is being taken from every other fresh stage. However, the time it takes from the point that extract is fed into the first of the two fresh stages to the time when the draw-off is completed from the second of the two fresh stages is about the same as the time for two draw-off cycles in conventional percolation processes.

Other percolation techniques sometimes utilized in commercial percolation processes such as varying the temperature profile across the percolators or varying the ratio of feed water to coffee weight per percolator are equally applicable to the process of this invention.

The process of this invention will now be described in further detail by reference to the following examples.

EXAMPLE I

The concept of the percolation process of this invention was demonstrated using a single bench-top percolator to simulate a full set of percolators.

First a control run was made. The percolator, which was 18 inches high and 3¼ inches in diameter was loaded with 681 grams of a standard blend of roasted and ground coffee. Coffee extract from a commercial percolator set operating on the same coffee blend was drawn off from the percolator next to the fresh stage (i.e., the extract that would normally be fed into the fresh percolator) and this extract was pumped into the bottom of the test column at a rate of 79 grams per minute and a temperature of 180° F. The concentration of this feed extract was 19.8 percent solids. Sixteen minutes after extract was first introduced into the bottom of the column, extract began issuing from the top. The draw-off was then started and the extract drawn off was collected in three portions, each weighing 340 grams. The total draw-off time was 18 minutes. Both the draw-off time and the fill time are comparable to commercial percolation processing times. The ratio of total draw-off weight to fresh coffee in the percolator was about 1.5:1 which is also comparable to many percolation processes.

A simulated double fresh column run (the process of this invention) was then made by reloading the bench-top percolator with an additional 699 grams of fresh ground coffee and pumping into the percolator each of the draw-off portions from the control run, followed by additional plant extract which had been drawn off for the control run. Extract feed temperatures and flow rates into the percolator were the same as used in the control run. A double draw-off of 2,100 grams was taken and the draw-off was again taken in 3 one-third portions weighing approximately 700 grams each.

The concentration in the different fractions of the draw-offs are summarized in the following table:

Concentration Of Extract Fractions

| Fraction of Draw-off | Control | Double Fresh Column |
|---|---|---|
| 1st ⅓ of draw-off | 28.2 | 30.9 |
| 2nd ⅓ of draw-off | 26.1 | 25.2 |
| 3rd ⅓ of draw-off | 24.8 | 23.1 |
| Combined total | 26.3 | 26.4 |

It is readily apparent from comparing the concentrations in the control and double fresh column runs that the concentration gradient is steeper for the double fresh column. The extract concentration in the first one-third of the draw-off was increased almost 10 percent over the control run and this increase represents about 9 percent more of the total solids in the first one-third of the draw-off as compared to the control run. Note that the overall concentrations for the two runs are essentially the same indicating that the actual yield of soluble solids in the two runs would be the same. As expected, expert tasters found that the most flavorful fraction of the extract draw-off was the first one-third of the extract.

EXAMPLE II

A run was made using a percolator set made up of six bench-top percolators of the size used in Example I. A control was made first using a feed water temperature of about 300° F. Flow rates were comparable to those used in the first example. The temperature of the extract going into the fresh stage was controlled about 185° F. When equilibrium conditions were obtained the extract draw-off from a percolator was divided into two portions equal in weight to 18 percent and 82 percent respectively of the total draw-off weight, and the concentration measured on each portion.

The percolation run was then continued but was changed to the operating conditions for the process of this invention. A double draw-off was taken from every other fresh column and two fresh columns were put on at the end of each draw-off. The draw-off was again divided into two portions equal in weight to 18 percent and 82 percent respectively of the total draw-off weight, and the concentrations of each portion was measured. The results of this experiment are summarized in the following table:

Concentration Of Extract Fractions

| Fraction of Draw-off | Control | Double Fresh Column |
|---|---|---|
| First 18% of draw-off | 32.4 | 39.2 |
| Last 82% of draw-off | 24.5 | 25.5 |
| Overall concentration | 26.0 | 28.0 |

Note that the concentration in the first 18 percent of the draw-off was significantly increased in the double fresh column operation and that about 11 percent more solids as compared to the control run are in the first portion of the extract when utilizing the process of this invention. The overall increase in concentration was unexpected and probably would not show up consistently in longer runs. Again it was found by expert tasters that the first fraction of the draw-off contained more desirable flavor components then did the second portion of the draw-off.

It is obvious that to continue the process including vapor stripping, add-back of volatile flavor components, concentration of extract and drying of the extracts are readily accomplished by known techniques. The additional benefits to be obtained via these processing steps are significantly increased due to the steeper concentration and flavor gradients obtained via the process of this invention. The foregoing examples were for illustrative purposes only and the scope of the invention is intended to be limited only by the appended claims.

What is claimed is:

1. In a process for producing a soluble coffee wherein roasted and ground coffee is percolated in a commercial percolator set containing a battery of percolator columns, said percolation being a semi-continuous, counter-current operation and wherein the extract drawn off the percolator columns is split into high and low concentration portions prior to drying to obtain a soluble coffee with a stable moisture content, the improvement comprising:
  a. filling two percolator columns with fresh roasted and ground coffee,
  b. stripping volatile aromatics from one of the fresh columns,
  c. placing the two fresh columns on stream after a draw-off cycle is completed such that additional draw-off is taken from the fresh column which has not been subjected to stripping, the use of two fresh columns resulting in a steeper concentration and quality gradient in the drawn off extract, and
  d. discharging ground coffee from the two percolator columns containing the most extracted ground coffee while extract is being drawn off from the freshly charged percolators.

2. The process of claim 1 wherein the extract drawn off from a percolator is split into two portions, the first portion containing not more than 50 percent by weight of the total draw-off, and the second portion containing the remainder of the extract drawn off; the volatile aromatics being added to the first portion of extract; the first portion of extract being freeze dried; the second portion of extract being spray dried; and the freeze dried and spray dried soluble solids being blended prior to packaging.

3. The process of claim 1 wherein the volatile aromatics are added back to the dry soluble coffee after the extract is dried.

4. The process according to claim 1 wherein the extract drawn off from a percolator is split into two portions, the first portion containing not more than 50 percent by weight of the total draw-off, and the second portion of the extract containing the remainder of the extract drawn off and wherein the second portion of extract is concentrated by evaporative concentration and the concentrated extract is blended with the first portion of extract and the volatile aromatics prior to freeze drying.

5. The process of claim 4 wherein additional volatile aromatics are stripped out of the second portion of extract prior to concentration and the additional volatiles are added to the blended extracts prior to freeze drying.

6. The process of claim 1 wherein the extract drawn-off from a percolator is split into two portions, the first portion containing not more than 50 percent by weight of the total draw-off, and the second portion containing the remainder of the extract drawn off.

7. The process of claim 6 wherein volatile aromatics are stripped out of the second portion of extract and collected and added to the first portion of extract; the second portion of extract is spray dried; the first portion of extract is freeze dried; and the spray dried and freeze dried soluble solids are blended before packaging.

8. The process of claim 6 wherein the first portion of extract is freeze dried; the second portion of extract is spray dried; and the spray dried and freeze dried soluble solids are blended before packaging.

9. The process of claim 6 wherein volatile aromatics are stripped out of the second portion of extract and collected; the second portion of extract is concentrated by evaporative concentration; and the concentrated second portion of extract, the volatile aromatics collected and the first portion of extract are blended prior to drying.

10. The process of claim 9 wherein the blended extract is freeze dried.

11. The process of claim 6 wherein the second portion of extract is concentrated by evaporative concentration; and the concentrated extract and the first portion of extract are blended prior to drying.

12. The process of claim 11 wherein the blended extract is freeze dried.

* * * * *